United States Patent
Dumchev et al.

(10) Patent No.: US 9,646,512 B2
(45) Date of Patent: May 9, 2017

(54) SYSTEM AND METHOD FOR AUTOMATED TEACHING OF LANGUAGES BASED ON FREQUENCY OF SYNTACTIC MODELS

(71) Applicant: Lingualeo, Inc., Road Town, Tortola (VG)

(72) Inventors: Artur Dumchev, Moscow (RU); Aynur Abdulnasyrov, Dyurtyuly (RU); Grigory Glushko, Moscow (RU)

(73) Assignee: Lingualeo, Inc., Tortola (VG)

( * ) Notice: Subject to any disclaimer, the term of this patent is extended or adjusted under 35 U.S.C. 154(b) by 218 days.

(21) Appl. No.: 14/522,940

(22) Filed: Oct. 24, 2014

(65) Prior Publication Data
US 2016/0117954 A1 Apr. 28, 2016

(51) Int. Cl.
G09B 19/06 (2006.01)
G09B 7/02 (2006.01)
(Continued)

(52) U.S. Cl.
CPC ........... *G09B 19/06* (2013.01); *G06F 3/0237* (2013.01); *G06F 17/27* (2013.01); *G06F 17/271* (2013.01); *G06F 17/2775* (2013.01); *G06F 17/2785* (2013.01); *G06F 17/3071* (2013.01); *G09B 7/00* (2013.01); *G09B 7/02* (2013.01); *G06F 17/30011* (2013.01); *G06F 17/30598* (2013.01);
(Continued)

(58) Field of Classification Search
CPC ...... G06F 3/0237; G06F 17/27; G06F 17/271; G06F 17/2785; G06F 17/3053; G06F 17/30598; G06F 17/3071; G06F 17/30731; G06F 17/30864; Y10S 707/99932; Y10S 707/99936; G09B 7/00; G09B 19/06

USPC .................................. 434/167, 170; 704/1, 9
See application file for complete search history.

(56) References Cited

U.S. PATENT DOCUMENTS

| | | | |
|---|---|---|---|
| 6,181,909 B1 * | 1/2001 | Burstein | G09B 7/00 |
| | | | 382/321 |
| 6,233,575 B1 * | 5/2001 | Agrawal | G06F 17/3071 |
| | | | 706/12 |

(Continued)

OTHER PUBLICATIONS

Rodrigo Augusto Igawa, Guilherme Sakaji Kido, José Luis Seixas, and Sylvio Barbon. 2014. Adaptive Distribution of Vocabulary Frequencies: A Novel Estimation Suitable for Social Media Corpus. In Proceedings of the 2014 Brazilian Conference on Intelligent Systems (BRACIS '14). IEEE Computer Society, Washington, DC, USA, 282-287. DOI=http://dx.doi.org.*

(Continued)

*Primary Examiner* — Nikolai A Gishnock
(74) *Attorney, Agent, or Firm* — Arent Fox LLP; Michael Fainberg

(57) ABSTRACT

Disclosed are systems, methods and computer program products for automated teaching of languages. In one example, a method includes receiving a text content in a natural language; parsing the received text content into one or more sentences; determining a syntactic model of the each sentence; determining a frequency of occurrence for each syntactic model based on a number of sentences associated with each syntactic model in the text content; sorting the one or more syntactic models based on each respective frequency; and generating one or more language teaching exercises, wherein an exercise includes one or more sentences selected based on the frequency of associated syntactic model.

20 Claims, 12 Drawing Sheets

(51) Int. Cl.
G06F 17/27 (2006.01)
G06F 3/023 (2006.01)
G09B 7/00 (2006.01)
G06F 17/30 (2006.01)

(52) U.S. Cl.
CPC .. G06F 17/30731 (2013.01); G06F 17/30864 (2013.01)

(56) References Cited

U.S. PATENT DOCUMENTS

| | | | | |
|---|---|---|---|---|
| 6,366,759 | B1* | 4/2002 | Burstein | G09B 7/00 382/321 |
| 6,405,161 | B1* | 6/2002 | Goldsmith | G06F 17/2755 704/9 |
| 7,453,439 | B1* | 11/2008 | Kushler | G06F 3/0237 345/168 |
| 7,539,934 | B2* | 5/2009 | Kender | G06F 17/30731 715/230 |
| 7,552,116 | B2* | 6/2009 | Chang | G06F 17/243 704/9 |
| 7,822,597 | B2* | 10/2010 | Brun | G06F 17/271 704/1 |
| 8,265,925 | B2* | 9/2012 | Aarskog | G06F 17/271 704/1 |
| 8,688,673 | B2* | 4/2014 | Sarkar | G06F 17/30705 707/706 |
| 9,208,144 | B1* | 12/2015 | Abdulnasyrov | G06F 17/289 |
| 2003/0118978 | A1* | 6/2003 | L'Allier | G09B 7/02 434/362 |
| 2003/0154070 | A1* | 8/2003 | Tokuda | G09B 19/06 704/9 |
| 2004/0205671 | A1* | 10/2004 | Sukehiro | G06F 17/2735 715/259 |
| 2016/0140234 | A1* | 5/2016 | Van Den Broek | G06F 17/24 707/706 |

OTHER PUBLICATIONS

Julian Warner. 2007. Analogies between linguistics and information theory: Research Articles. J. Am. Soc. Inf. Sci. Technol. 58, 3 (Feb. 2007), 309-321. DOI=http://dx.doi.org/10.1002/asi.v58:3.*

Uzuntiryaki, E., Boz, Y., Kirbulut, D. et al. Do Pre-service Chemistry Teachers Reflect their Beliefs about Constructivism in their Teaching Practices? Res Sci Educ (2010) 40: 403. doi:10.1007/s11165-009-9127-z First Online: May 5, 2009 DOI: 10.1007/s11165-009-9127-z.*

Serdyukov, Peter. "Does Online Education Need a Special Pedagogy?." CIT 23 (2015): 61-74.*

Li, W.; Miramontes, P.; Cocho, G. Fitting Ranked Linguistic Data with Two-Parameter Functions. Entropy 2010, 12, 1743-1764.*

Terzopoulos, A.R., Duncan, L.G., Wilson, M.A.J., Niolaki, G. and Masterson, J. (2016) HelexKids: A word frequency database for Greek and Cypriot primary school children. Behavior Research Methods, volume in press http://dx.doi.org/10.3758/s13428-015-0698-5.*

P Grainger, K Purnell, R Zipf. (Apr. 1, 2008) Judging quality through substantive conversations between markers. Assessment & Evaluation in Higher Education 33 (2), 133-142.*

Ted Briscoe, 2008. "Language learning, power laws, and sexual selection," Mind & Society—Cognitive Studies in Economics and Social Sciences, Springer;Fondazione Rosselli, vol. 7(1), pp. 65-76, June.*

Miron, Eli; Ravid, Gilad. Facebook Groups as an Academic Teaching Aid: Case Study and Recommendations for Educators. Journal of Educational Technology & Society . Oct. 2015, vol. 18 Issue 4, p. 371-384. 14p.*

Kaisheng Huang. More does not mean better: Frequency and accuracy analysis of lexical bundles in Chinese EFL learners' essay writingOriginal Research Article. System, vol. 53, Oct. 2015, pp. 13-23.*

Ernest Blum. The New Old Way of Learning Languages. The American Scholar, Autumn 2008, pp. 80-88.*

Lennart Bjomeborn, Peter Ingwersen. Toward a Basic Framework for Webometrics. Journal of the American Society for Information Science and Technology, 55(14):1216-1227, 2004.*

NLTK 3.0 Documentation. Jan. 2, 2017 <retrieved online from http://www.nitk.org/ [Mar. 20, 2017]>.*

Manning, Christopher D., Mihai Surdeanu, John Bauer, Jenny Finkel, Steven J. Bethard, and David McClosky. 2014. The Stanford CoreNLP Natural Language Processing Toolkit in Proceedings of the 52nd Annual Meeting of the Association for Computational Linguistics: System Demonstrations, pp. 55-60.*

* cited by examiner

[text]
-> [sentence 1]
: :
-> [sentence Ns]
  -> tokens:
    -> [token 1]
    : :
    -> [token Nt]
      -> pos_tag: [pos_tag Nt]
      -> lemma: [lemma Nt]
      -> start_offset: [start_offset Nt]
      -> end_offset: [end_offset Nt]
      -> tag_sequence: [pos_tag 1, ..., pos_tag Nt] (syntax model)

FIG. 4

I have done my homework.
```
{
 tokens: [
  {
   "token":"I",
   "startOffset":0,
   "endOffset":1,
   "tag":"PRP",
   "lemma":"I"
  },
  {
   "token":"have",
   "startOffset":2,
   "endOffset":6,
   "tag":"VBP",
   "lemma":"have"
  },
  {
   "token":"done",
   "startOffset":7,
   "endOffset":11,
   "tag":"VBN",
   "lemma":"do"
  },
  {
   "token":"my",
   "startOffset":12,
   "endOffset":14,
   "tag":"PRP$",
   "lemma":"my"
  },
```

```
  {
   "token":"home",
   "startOffset":15,
   "endOffset":19,
   "tag":"NN",
   "lemma":"home"
  },
  {
   "token":"work",
   "startOffset":20,
   "endOffset":24,
   "tag":"NN",
   "lemma":"work"
  },
  {
   "token":".",
   "startOffset":24,
   "endOffset":25,
   "tag":".",
   "lemma":"."
  }
 ],
 "tag_sequence":"PRP
       VBP VBN PRP$ NN NN ."
}
```

FIG. 5

SYSTEM AND METHOD FOR AUTOMATED TEACHING OF LANGUAGES BASED ON FREQUENCY OF SYNTACTIC MODELS

TECHNICAL FIELD

This disclosure relates generally to the field of linguistics and, in particular, to systems and methods for automating the teaching of language based on frequency of syntactic models.

BACKGROUND

Most of the methods of teaching languages take account of the factor of frequency of the lexical units of a language. In accordance with Zipf's law, the most frequent word in any language will occur approximately twice as often as the second most frequent word, three times as often as the third most frequent word, etc. In other words, a small number of words of a language that are used most frequently in the language may cover a large portion of the total number of word usages. Therefore, when learning a new language, the most effective technique is to first study these most frequent words. However, the existing methods of language learning do not take into account such a distribution of syntactic models. A study conducted on the basis of 20 million sentences stored on a server has shown that such laws exist not only in vocabulary, but also in syntax: a total of 6 million unique models were found, while 48,000 syntactic models cover 37% of the total number of sentences in texts.

A rather large number of services exist for teaching foreign languages through electronic devices, where a user needs to study rules of grammar, memorize groups of words and phrases, do exercises, and take tests. The systems of instruction in such services are not developed automatically, which proves to be a very costly and time-consuming process. Thus, it is desirable to create automated systems of teaching of syntax, grammar and vocabulary.

SUMMARY

Disclosed are systems, methods and computer program products for automating teaching of languages based on frequency of syntactic models used in these languages.

In one example aspect, a computer server system collects different text materials (content) and performs an analysis of the received materials, partition all of the text materials into sentences, and then select syntactic models from the available sentences and determine the frequency of the syntactic models based at least on the number of sentences making up one syntactic model or another. Each user who has registered on the computer server system may input any given text materials, which may affect the frequency of the syntactic models. Information about frequency of word may also be saved on the computer server system, and the more texts are accumulated on the computer server system, the more relevant the information on the prevalence (popularity, frequency) of a particular syntactic model. The system then generates language teaching exercises for forming phrases based on different syntactic models that are sorted by frequency, store learning statistics, determine user's level of mastery of each syntactic model, and also allow user to add models for independent study.

In one aspect, an example method for automated teaching of languages includes: receiving a text content in a natural language; parsing the received text content into one or more sentences; determining a syntactic model of the each sentence; determining a frequency of occurrence for each syntactic model based on a number of sentences associated with each syntactic model in the text content; sorting the one or more syntactic models based on each respective frequency; and generating one or more language teaching exercises, wherein an exercise includes one or more sentences selected based on the frequency of associated syntactic model.

In one example aspect, parsing the text content into the one or more sentences may include: partitioning the received text content into one or more tokens; removing extensible markup language (XML) associated with each token from the received text content; partitioning the one or more tokens into the one or more sentences; determining a part of speech tag to correspond to each token of each sentence; determining a lemma to correspond to each token of each sentence; and saving a link associating information of each sentence with a corresponding syntactic model. In one example, each token comprises metadata indicating the part of speech tag, the lemma, and the position of each token in each sentence. In another example, the lemma is configured to determine a set of trick words for each token.

In one example aspect, the method may further include filtering and removing improper syntactic models related to profanity, grammatical mistakes, and substandard syntactic models.

In one example aspect, the method may further include: displaying information to explain the one or more syntactic models; and configuring the displayed information for providing teaching exercises in connection with the one or more syntactic models.

In one example aspect, the method may further include: storing learning statistics of the language by a user in response to the automatically generated language teaching exercises; and determining and storing a level of mastery of each syntactic model based on the learning statistics.

In one example aspect, the method may further include: obtaining one or more text contents; and repeating the parsing of the one or more text contents to correlate with the one or more syntactic models and update a frequency associated with each syntactic model.

In one example aspect, the method may further include: sorting the one or more syntactic models based on a tree clustering structure in accordance with a complexity of each syntactic model.

In one aspect, an example computing system for automated teaching of languages, comprising: a syntactic analysis module configured to: receive a text content in a natural language; parse the received text content into one or more sentences; determine a syntactic model of the each sentence; determine a frequency of occurrence for each syntactic model based on a number of sentences associated with each syntactic model; sort the one or more syntactic models based on each respective frequency; and an exercise generation module configured to generate one or more language teaching exercises, wherein an exercise includes one or more sentences selected based on the frequency of associated syntactic model.

In one aspect, an example computer program product, stored in a non-transitory computer-readable storage medium, comprises computer-executable instructions for automated teaching of languages, including instructions for receiving a text content in a natural language; parsing the received text content into one or more sentences; determining a syntactic model of the each sentence; determining a frequency of occurrence for each syntactic model based on a number of sentences associated with each syntactic model in the text content; sorting the one or more syntactic models based on each respective frequency; and generating one or more language teaching exercises, wherein an exercise includes one or more sentences selected based on the frequency of associated syntactic model.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIG. 4 shows an example of a generic data structure for storing syntactic model of a text according to one example aspect.

FIG. 5 shows an example data structure for storing a syntactic model of a sentence according to one example aspect.

DETAILED DESCRIPTION

Example aspects are described herein in the context of a system, method and computer program for automated teaching of languages based on frequency of syntactic models, and in particular, for teaching syntax, grammar and vocabulary of different languages, using as a foundation the frequency of syntactic models obtained via syntactic analysis of texts provided by system users. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A syntactic model of a sentence may comprise a sequence of tags of different parts of speech constituting the given sentence. To construct these models, tags may be used from a treebank, such as a Penn Treebank or BulTreeBank. Treebank is a parsed text corpus that annotates syntactic or semantic sentence structure. In one example aspect, a syntactic model may comprise any unique sequence of tags of the part of speech that may be characterized by a set of sentences corresponding to this model. In corpus linguistics (i.e., the study of language as expressed in samples (corpora) of "real world" text), part of speech tagging (P.O.S. tagging, or grammatical tagging or word-category disambiguation) may comprise the process of marking up a word in a text (corpus) as corresponding to a particular part of speech, based on both its definition, as well as its context, i.e., a relationship with adjacent and related words in a phrase, sentence, or paragraph. For example, a simplified form of part of speech tagging may comprise the identification of words as nouns (NN), verbs (VB), adjectives (JJ), adverbs (RB), etc. In an aspect, P.O.S. tagging, in the context of computational linguistics, may use algorithms which associate discrete terms, as well as hidden parts of speech, in accordance with a set of descriptive tags. P.O.S. tagging algorithms may be rule-based or stochastic.

Figure 1:
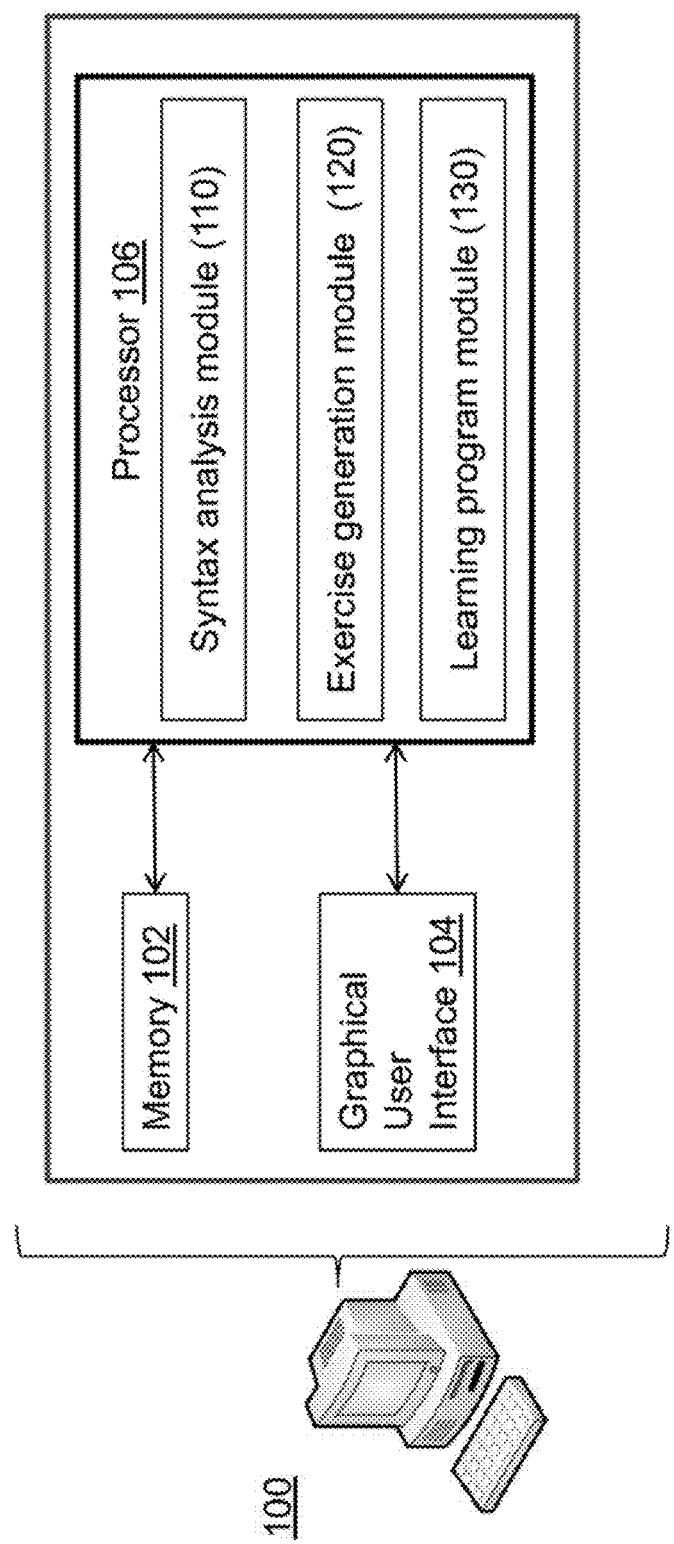
FIG. 1 illustrates a general system architecture for automated teaching of languages based on frequency of syntactic models according to one example aspect.

FIG. 1 shows a general architecture of a computer server system for automated teaching of a language based on frequency of occurrence of various syntactic models in that language according to one aspect. System 100 may be implemented as a software application, a desktop widget, a web application, an applet, a script or other type of software program code executable on a computer device, such as a PC, tablet, notebook, smart phone or other type of computing devices. In one example aspect, the program may be hosted by a web application server and accessed by the user via the Internet. The system 100 may have a plurality of software and hardware modules, including but not limited to a memory or computer medium storage 102, a graphical user interface 104, and a processor 106 comprising a syntax analysis module 110, an exercise generation module 120, and a teaching program module 130.

The term "module" as used herein means a real-world device, apparatus, or arrangement of modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 12 below). Accordingly, each module can be realized in a variety of suitable configurations, and should not be limited to any particular implementation exemplified herein.

In one example aspect, the computer server system 100 is operable to collect various texts in one or more different languages (e.g., English, Russian, etc.), which are subsequently used for the syntactic analysis and generation of language teaching exercises for system users. The texts may include, but not limited to books, articles, song lyrics, poetry, film subtitles or other text materials, hereinafter collectively called content. This content may be collected and stored into the computer server system 100 by the system administrators, automatically collected by the system 100 from the Internet and various public and private online databases, or provided by the system users via the graphical user interface 104 of the system 100.

Upon receiving a text content, the syntax analysis module 110 of the system 100 may partition the received text into sentences. For each sentence, the syntax analysis module 110 may determine a syntactic model corresponding to each sentence. Syntactic models may then be stored in a database (e.g., in the memory 102) with information regarding their frequency of occurrence in the text. To create a teaching program 130, data may be obtained as a result of the operations of syntax analysis module 110, and the exercise generation module 120, and presented to a user via the graphical user interface 104. Presenting information via the graphical user interface 104 may alternatively include, for example, displaying information on a different display device than the computer server system 100, transmitting information to another device external to the system 100, transmitting visual or acoustic signals corresponding to certain information, receiving haptic feedback corresponding to the presented information, or transmitting signals comprising haptic feedback corresponding to certain information to a user's designated device for presentation to the user.

Figure 2:
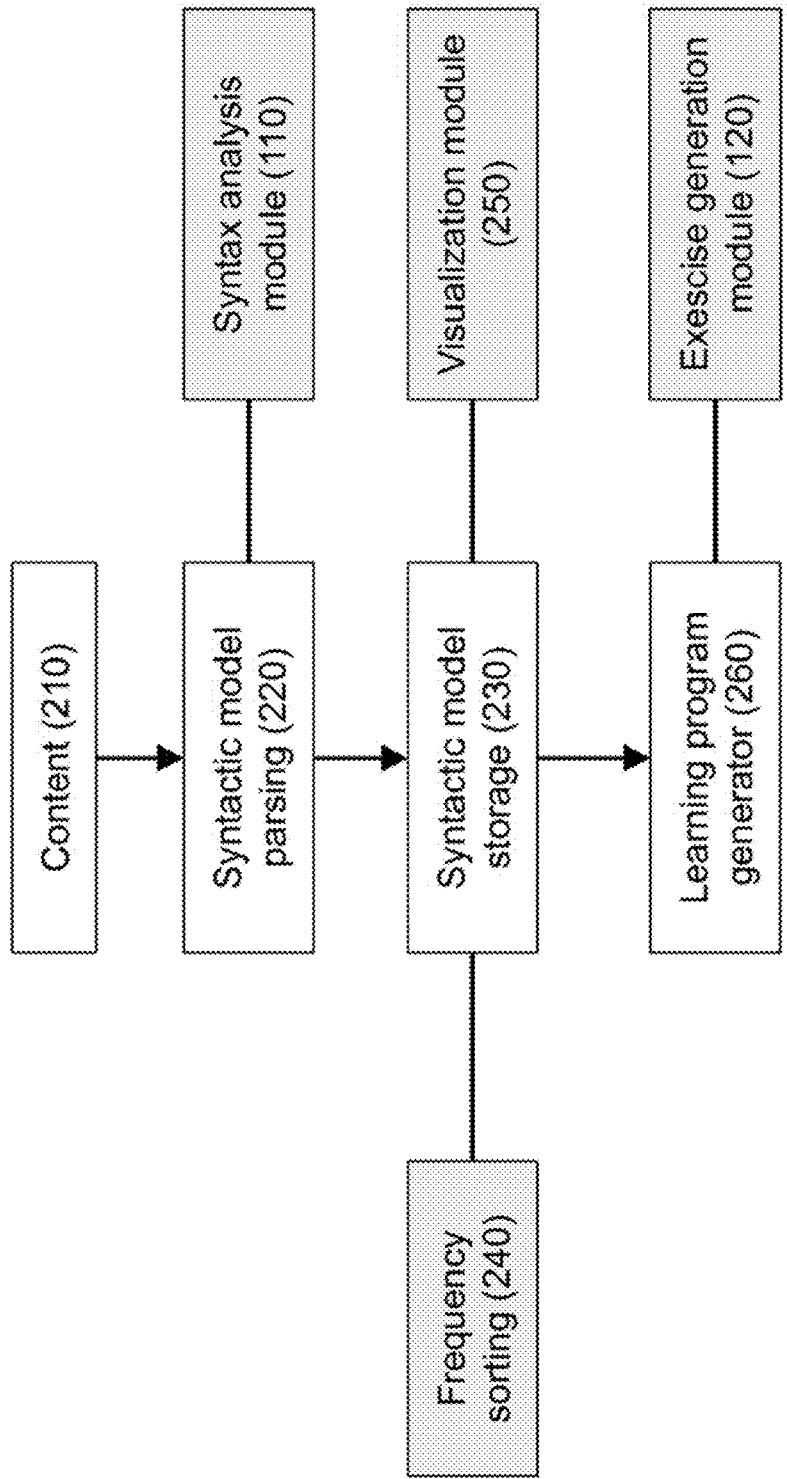
FIG. 2 illustrates a detailed system architecture for automated teaching of languages based on frequency of syntactic models according to one example aspect.

FIG. 2 shows in greater detail the architecture and operation of the computer server system 100 of FIG. 1 for automated teaching of languages according to one example aspect. In one example aspect, the content 210 received by the computer server system 100 may be subjected to syntactic model parsing 220 by the syntax analysis module 110. The syntax analysis module 110 may perform a syntactic model parsing 220 by partitioning the text into tokens, that is, performing a tokenization. Generally, tokenization is the process of partitioning a stream of text into words, punctuation or other meaningful elements called tokens.

The syntax analysis module 110 then partitions the tokenized text into sentences using punctuation tokens. Thus, for example, a period, exclamation mark, a question mark, and a semicolon may indicate an end of a sentence. In one example aspect, the syntax analysis module 110 may partition the tokenized text 210 containing complex or compounded sentences into simple sentences. In this case, syntax analysis module 110 may analyze the structure of a sentence to identify independent and subordinate clauses. Thus, the newly formed sentences may, for example, include simples sentence formed from parts of the original complex or compound sentences. Next, the syntax analysis module 110, for each token in the sentence, may determine the lemma and part of speech tag (P.O.S. tag) corresponding to the token using for example Penn Treebank, BulTreeBank or other treebank structures. Then, the syntax analysis module 110 may save in the syntactic model storage 230 a link between the specific sentence and the associated unique syntactic model.

Next, a frequency sorting 240 may be performed based on the number of sentences associated with a given syntactic model. This process shall be described in greater detail below. In one example aspect, the system 100 may also include a visualization module 250 that may be configured to display to the user information relating to each of the syntactic models. Learning program generation 260 may be performed based on the frequency sorting 240 and the exercise generation module 120. In one aspect, a study sequence of syntactic models may be constructed based on the frequency sorting 240, and an exercise for memorization may be prepared for each model, using the exercise generation module 120.

Figure 3:
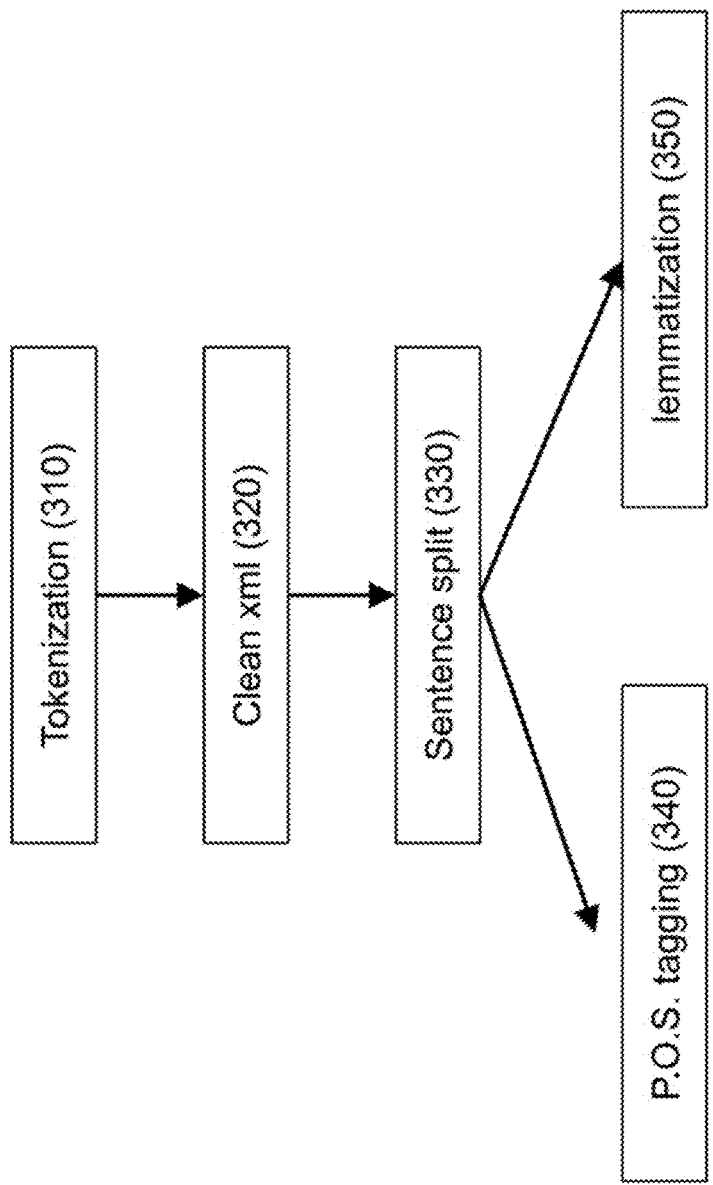
FIG. 3 illustrates an example syntax parsing process for automated teaching of languages based on frequency of syntactic models according to one example aspect.

FIG. 3 discloses in detail an example process of syntactic model parsing 220 performed by the syntax analysis module 110. The process of syntactic model parsing 220 may include a tokenization 310, xml cleaning 320, a sentence split 330, a P.O.S. tagging 340, and a lemmatization 350. In the tokenization step 310, a text may be partitioned into words, punctuation and other significant text elements, such as numbers. In the clean extensible markup language (xml) step 320, the xml of the tokens may be removed from the text. Next, in the sentence split step 330, the tokenized text may be partitioned into sentences. In the P.O.S. tagging step 340, a part of speech tag (i.e., P.O.S. tag) may be determined for each token of the sentence using for example Penn Treebank, BulTreeBank or other treebank structures. In step 350, the lemma (canonical form, dictionary form, or citation form of a set of words (headword)) may be determined for each token of the sentence. The result of the sentence analysis may be saved in the syntactic model storage 230 for later use by the exercise generation module 120. In one example aspect, the syntax analysis module 110 may also use a natural language processing toolkit, such as Stanford-CoreNLP, nltk or other, for processing of text content during tokenization, xml cleaning, sentence split, POS tagging and/or lemmatization processes. In one example aspect, the syntax analysis module 110 may filter and remove from syntactic model storage 230 any improper syntactic models, such as models relating to profanity, grammatical mistakes, and substandard syntactic models.

FIG. 4 shows an example of a generic data structure for storing a syntactic model of a text, which may be stored in the syntactic model storage 230. A text may be separated into a series of sentences ([sentence 1], [sentence 2], . . . [sentence N]), where each sentence may comprise a series of tokens ([toke 1], [token 2], . . . [toket Nt]. A token may include additional metadata, including but not limited to the part of speech tag (post_tag), the lemma (lemma), the position of the token in the sentence (start_offset, end_offset). The part of speech tags may be used to understand which syntactic model corresponds to a given sentence. The lemma may be used by the exercise generation module 120 to search for confusing words (trick words) for a specific word in the sentence. Trick words may be used to complicate the task of performing the exercises, and will be explained in greater detail below. The position of a token in the sentence may be used when displaying the sentence to a user. In search for trick words, words having the same lemma as the initial word may be used for each initial word of the sentence. For pronouns and certain other words, trick words may be taken from previously prepared lists.

FIG. 5 shows an example syntactic data structure for storing a syntactic model of the sentence "I have done my homework" in the syntactic model storage 230 according to one example aspect. As show in the figure, the sample sentence may be processed by the syntax analysis module 110 to generate a plurality of tokens for each word of the sentence. Thus, for example, a separate token data structure can be generated for word "I". This data structure will include a "token" indicator having value "I"; a position indicators "statrtOffset" and "endOffset" having values "0" and "1", respectively, that indicate the position of first and last letter of the word in the sentence relative to the beginning (or null position); a part of speech indicator "tag" having value "PRP" (Personal Pronoun); and a lemma indicator having value "I". Similar data structures may be generated for all or some other words in the sentence as shown in FIG. 5. The data structure may also contain a tag sequence indicator of all POS tags occurring in the sentence ("PRP VBP VBN PRP$ NN NN"). Other type of information about the sentence may be stored in the syntactic data structure in other aspects.

Figure 6:
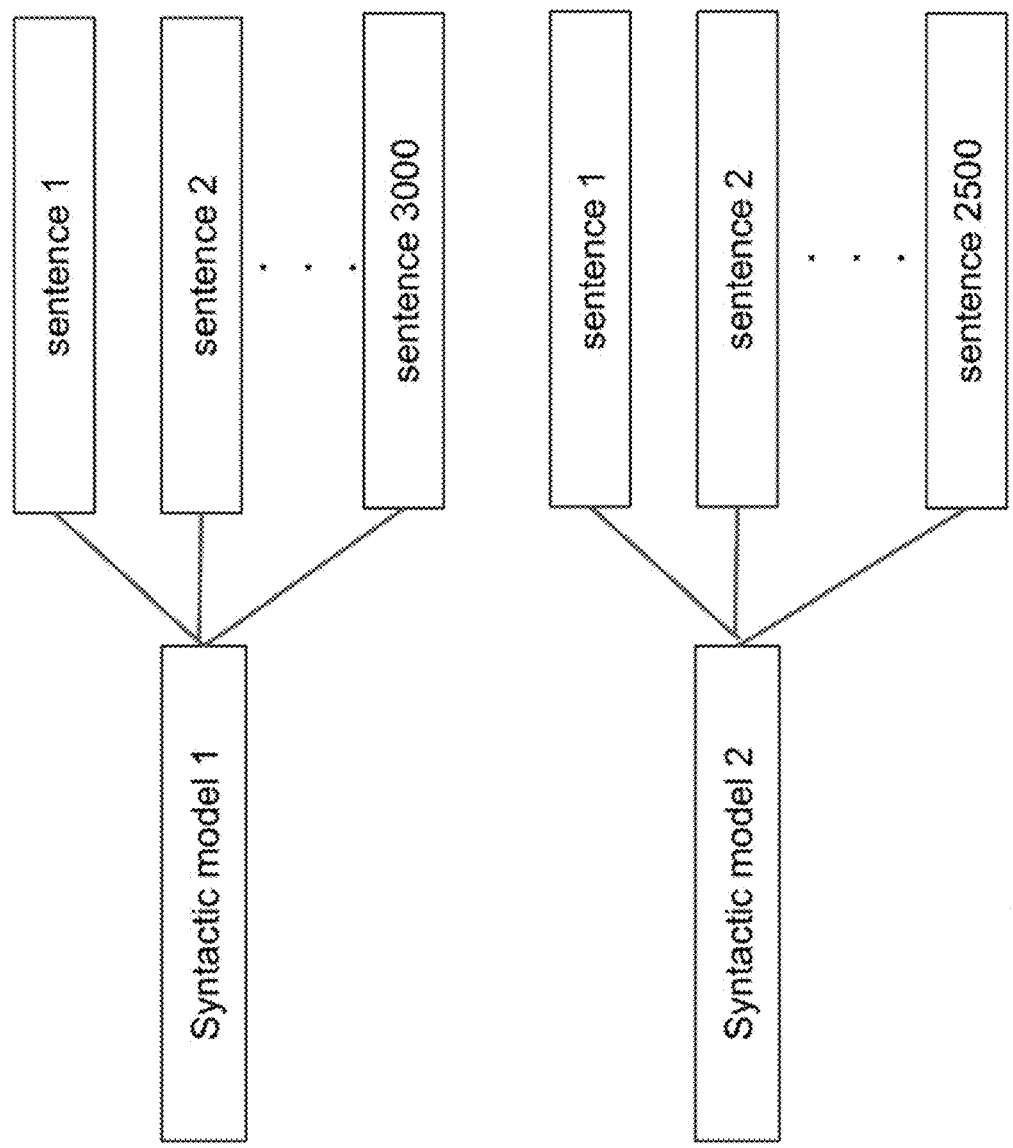
FIG. 6 shows an example frequency sorting of syntactic models for automated teaching of languages according to one example aspect.

FIG. 6 illustrates an example architecture for frequency sorting of syntactic models of sentences in accordance with one example aspect. Frequency sorting 240 (in FIG. 2) of syntactic models may be performed by comparing syntactic models of sentences from the processed text content and identifying matching (i.e., identical) syntactic models. Two syntactic models are matching when all tags in those models are the same and in the same order. Models that have different or extra tags are not considered matching. For example, one of the most frequent syntactic models found in English language is "PRP VBP DT NN", where PRP—personal pronoun; VBP—verb, non-3rd person singular present; DT—determiner; NN—noun, singular or mass. The following examples of sentences will have matching syntactic model: "I have no idea."; "I need a drink."; "We have a problem."; "I know the feeling." Another frequent syntactic model is "DT NN VBZ JJ", where DT—determiner; NN—noun; VBZ—verb, 3rd person singular present; JJ —adjective. The following example sentences will have matching syntactic models: "The day is beautiful."; "The sky is blue."; "The car is fast"; "The building is tall". Therefore, as shown in FIG. 6, syntactic analysis of some text content and subsequent frequency sorting may result in identification of two very frequent syntactic models Syntactic model 1: is "PRP VBP DT NN", and Syntactic model 2: "DT NN VBZ JJ", and a corresponding number of matching sentences for each syntactic model is, for example 3000 and 2500, respectively. In yet another example aspect, different syntactic models may be prioritized based on the number of occurrence of sentences associated with each syntactic model. For example, as shown in FIG. 6, syntactic model 1 may have higher important or priority than syntactic model 2, because syntactic model 1 has 3000 associated sentences, while syntactic model 2 has only 2500 associated sentences.

Figure 7:
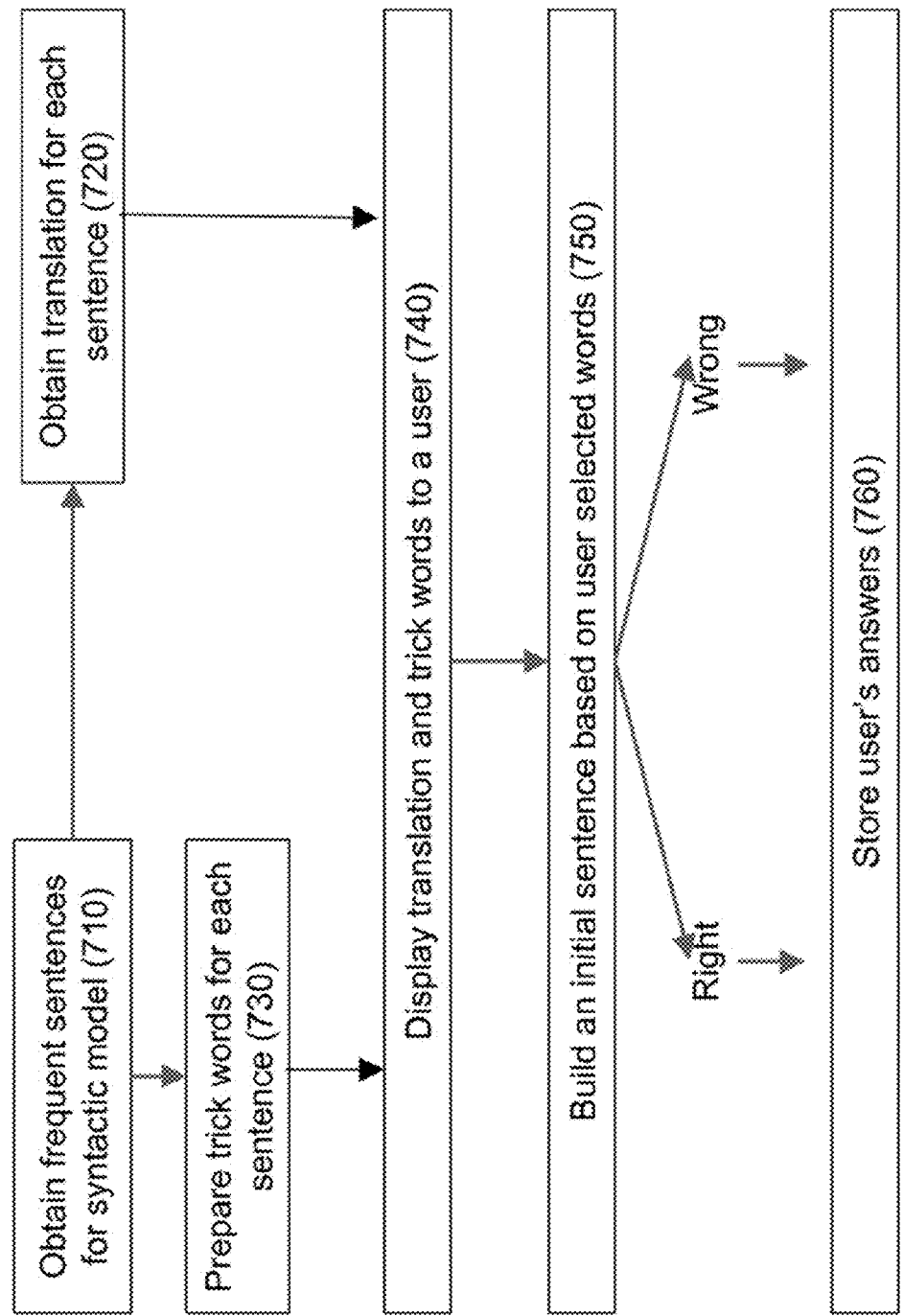
FIG. 7 shows an example process for automatically generating language teaching exercises based on frequency of syntactic models according to one example aspect.

FIG. 7 shows an example process of generating language teaching exercises based on determined frequency of occurrence of syntactic models in accordance with one example aspect. For a syntactic model, a certain number (generally predetermined) of frequent sentences with metadata from the syntactic analysis having the given syntactic model and having a translation into the native language of a user or another foreign language may be extracted from the syntactic model storage 230. In each sentence, trick words may be chosen for one or more words of the sentence by the exercise generation module 120. The information about trick words may be stored in the syntactic model storage 230. Trick words may include, but not limited to synonyms, pronouns, phonetically similar words, different verb tenses, plural forms, auxiliary verbs, comparative and superlative adjectives, etc. For example, the sentence "I have no idea." contains the following words:

0: {text:I, relations:{0:I, 2:MY, 3:ME, 4:MINE}}
1: {text:HAVE, relations:{0:HAVE, 1:HAVING, 2: HAS, 3:HAD, 4:HAVES}}
2: {text:NO, relations:{0:NO, 1:NONE, 2:NEITHER, 3:NOT, 4:NORE, 5:NOPE}}
3: {text:IDEA, relations:{0:IDEA, 2:IDEAS}}

In this sentence, word "I" may have the following associated trick words "My", "Me" and "Mine", and word "No" may have trick words, such as "Nope", "Neither", "Not", "Nore", etc.

In another example, the sentence "I need a drink." contains the following words:

0: {text:I, relations:{0:I, 2:MINE, 3:ME, 4:MY}}
1: {text:NEED, relations:{0:NEED, 1:NEEDED, 3:NEEDS, 4:NEEDING}}
2: {text:A, relations:{0:A, 1:THE, 2:AN}}
3: {text:DRINK, relations:{0:DRINK, 1:DRUNK, 2:DRINKING, 3:DRINKED, 4:DRINKEST, 5:DRINKS, 6:DRANK}}

In this sentence, word "A" may have the following associated trick words "An" and "The", and word "Drink" may have trick words, such as "Drunk", "Drinking", "Drinks", etc.

In one example aspect, the exercise generation module 110 may provide a translation of each generated sentence into the native language of the user or another foreign language. The translation of the sentences may be done automatically using for example Google Translate service. In one example aspect, the translation may be checked for accuracy by human linguists. The exercise generation module 110 may also, for each token, search for associated trick words in the syntactic model storage 230. The module 110 may then display to the user an incomplete the translation of the sentence and a set of trick words for one or more untranslated words in the translated sentence, as will be shown in various examples below. The exercise generation module 110 may then ask the user to compose the translated sentence by choosing the appropriate words from the provided list of trick words.

The user's answers may be saved on the computer server system, and upon reaching a given predetermined number of correctly composed sentences the given syntactic model may be considered to have been learned by the user. Information as to the user's mastery of the syntactic model may be saved on the computer server system. For example, the user_syntax_model table may be used; for communication with the user, the external key user_id may be used; for communication with the syntactic model, the external key syntax_model_id may be used. The progress field may be used to save the degree of mastery.

In yet another example aspect, different variations of structurization of the syntactic models may be determined. One method of structurisation of the syntactic models may be grouping them by tenses, or other grammatical aspect. Using this method, the system can prepare exercises for learning syntactic models for specific grammatical form. For example, a learning program may consist of several levels. At first level there will be exercises for Present Simple Tense, Past Simple Tense and Future Simple Tense learning. At the second level learning program may include Continuous and Perfect tenses. At the next level it is possible to study Perfect Continuous tenses. The main value of the described aspect is that the user studies target language grammar with the most frequent sentences of the most frequent syntactic models. Another method of structurisation may include detection of parent-child relations between syntactic models. For example, the model "PRP VBP" (e.g., "I see", "You like") is the parent model for the model children "PRP VBP PRP" ("I see you", "You like him"), and when a student learns the model "PRP VBP PRP", he/she also repeat the parent model "PRP VBP". The use of tree clustering data structures allows sorting and presentation of syntactic models to a student based on their level of complexity. In this manner, a student may learn syntactic models by branches, wherein the study of new, more complicated (children) models may help in the repetition of those already learned (parents models). Yet in another aspect, the system allows the user to check any sentences including ones that user writes himself for affiliation with one of the known syntactic models and grammatical branches.

Figure 8:
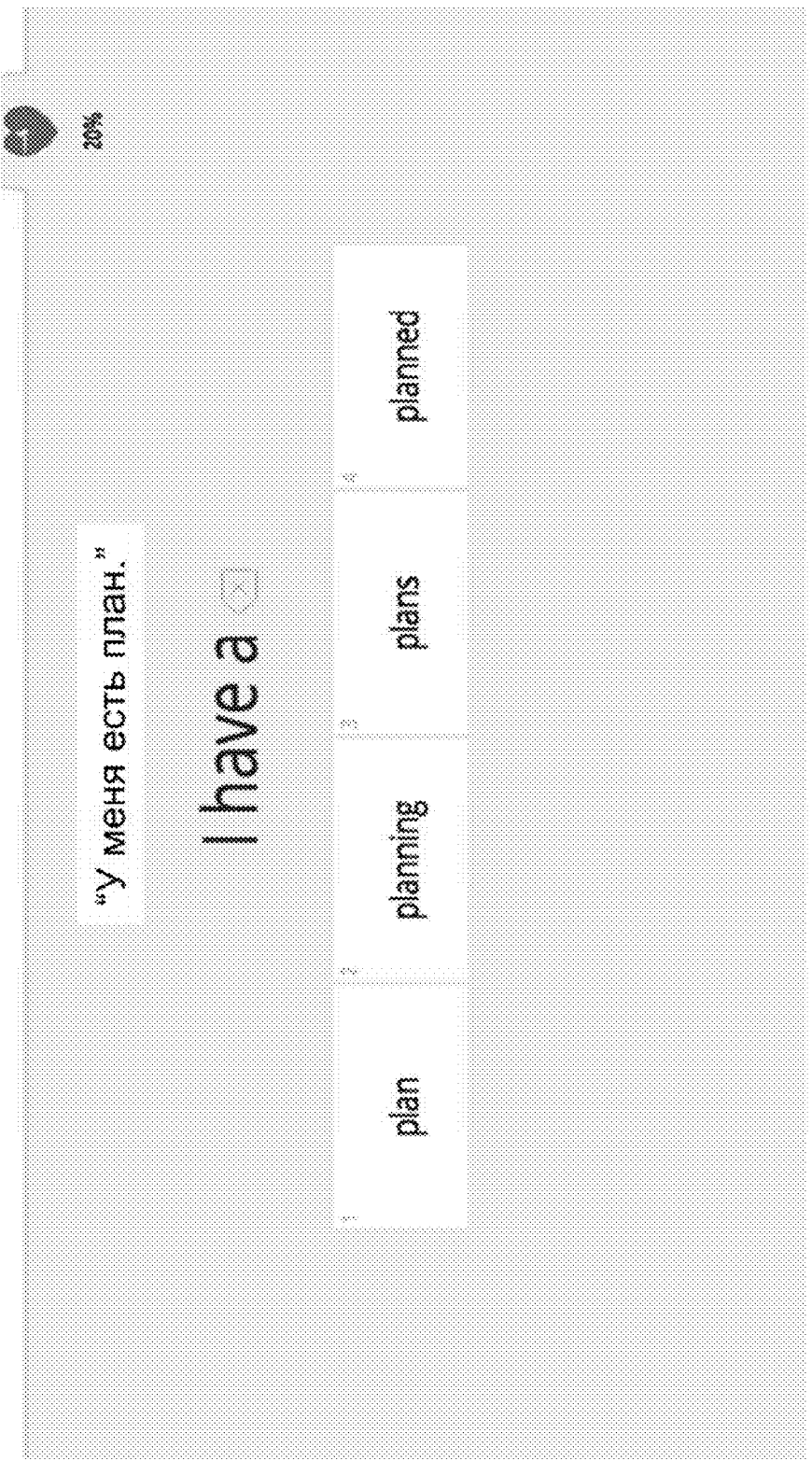
FIG. 8 shows an example exercise for automated teaching of languages based on frequency of syntactic models according to one example aspect.

FIG. 8 shows an example of performing exercises to learn syntactic model "PRP VBP DT NM", conventionally called "1 have no idea." As shown, a Russian-speaking user is provided with a Russian language sentence "У меня есть план", which in English means "I have a plan." The user is provide with a translation of the first three words "I have a" and has to complete the sentence. The user is provided with four options of trick words: 1. "plan", 2. "planning", 3. "plans", 4. "planned", Basically, the user has to decide how to correctly translate the last word of the sentence "план". Thus, the vocabulary of the target language is studied by constant word choices in a process of a so-called latent learning. Latent learning, whose effectiveness was first confirmed by Edward Tolman in a study done in 1930, may be realized in accordance with aspects of the invention by studying vocabulary through performing grammatical exercises where a user may select the necessary words to compose sentences. In this process, the user may increase passive knowledge of vocabulary by studying syntactic models and rules of grammar but without having a goal of actually studying vocabulary of foreign language.

Figure 9:
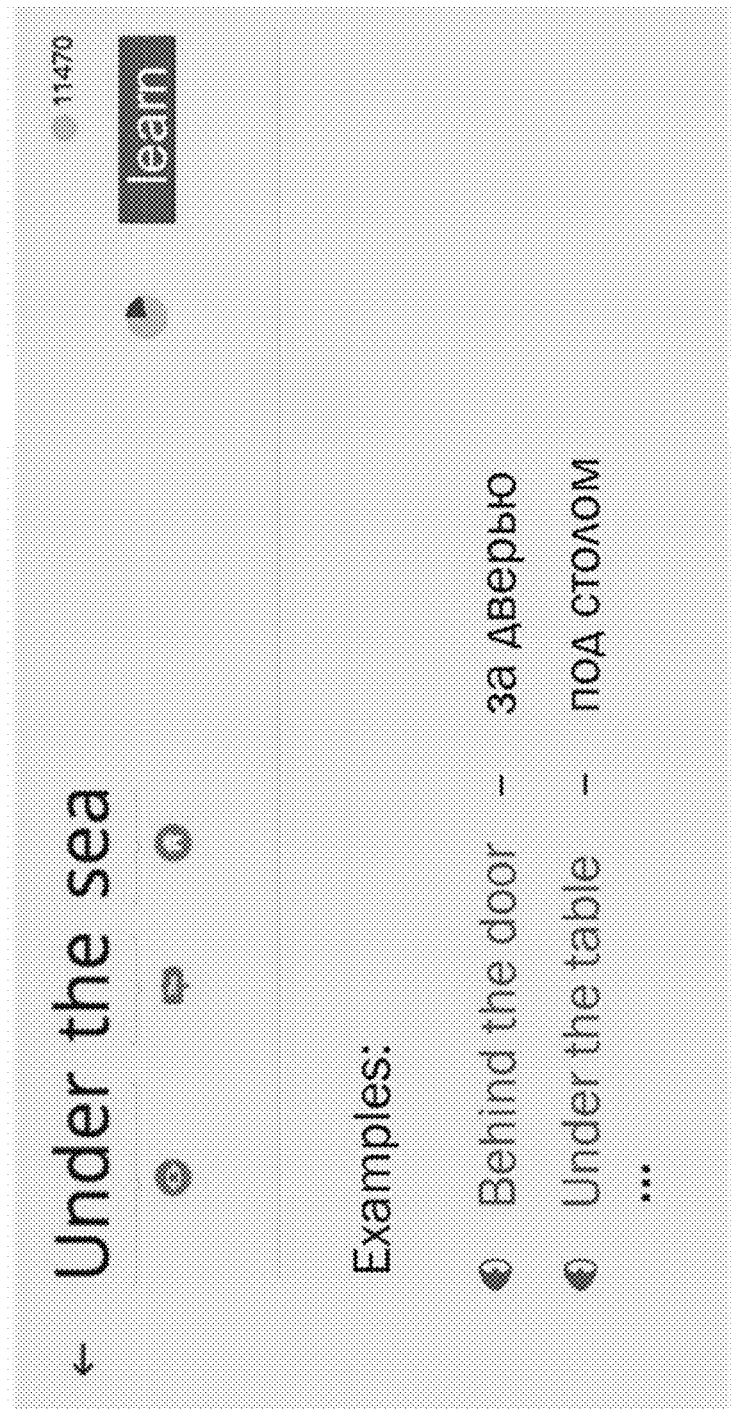
FIG. 9 shows an example screen shot of syntactic model learning exercise for automated teaching of languages according to one example aspect.

FIG. 9 shows an example screen shot of a learning exercise for a syntactic model "IN DT NM", where IN—preposition or subordinating conjunction; DT—determiner; NN—noun, singular or plural. The conventional name of the model is "Under the sea". This means that the sentence "Under the sea" in the context of this syntactic model was encountered very frequently in the text content that was processed by the syntax analysis module 110. As shown in the FIG. 9, the learning exercise may provide two or more examples of sentences having a similar syntactic model: "Behind the door." and "Under the table.", and Russian language translations of these sentences. In addition, the teaching program may also provide the automated pronunciation of these sentences in English language.

Figure 10:
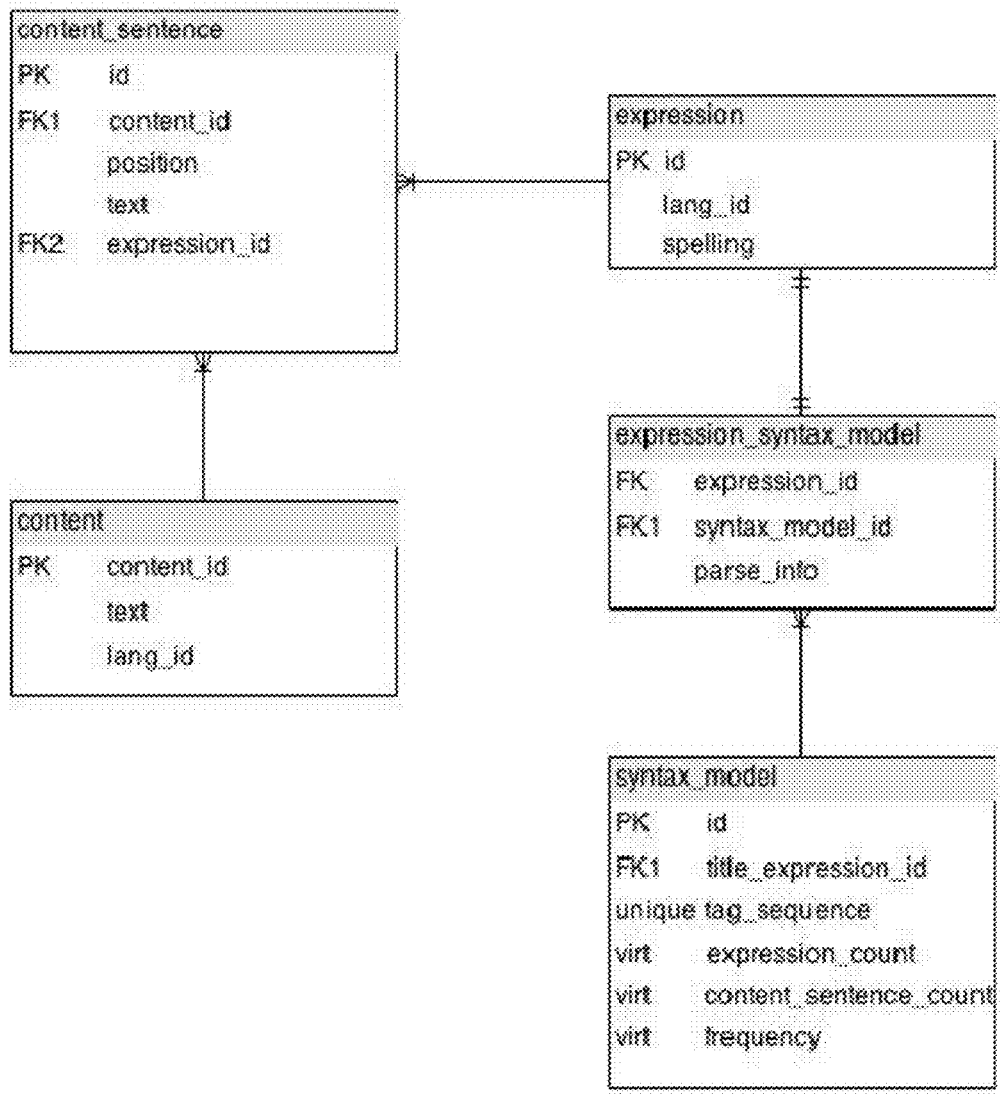
FIG. 10 shows an example data structure and working diagram of storing data on an example syntactic model for automated teaching of languages according to one example aspect.

FIG. 10 describes an example data structure and the working diagram of the individual elements of the system for storing data on the syntactic models according to one example aspect. The content table may store collected text contents. The content_sentence table may store the texts partitioned into sentences. The external key content_id may be used for communication with the content table. The position field may be used to restore the initial text from the sentences. The external key expression_id may be used for communication with normalized sentences. The expression table may save the normalized sentences in various languages. A normalized sentence may comprise a line produced by excluding from the initial sentence needless whitespace characters (\n, \t and so on). The lang_id field may be used to indicate the language of the sentence. The spelling field may save the normalized sentence. Several sentences in the texts may correspond to the same normalized sentence. The syntax_model table may store the unique syntactic models (tag_sequence). The title_expression_id field of the syntactic model may save a reference to the most frequent sentence of the given syntactic model. The expression_count may be the number of normalized sentences for the given syntactic model. The content_sentence_count may be the number of initial sentences for the given syntactic model. The frequency may be calculated as content_sentence_count/(total number of initial sentences). The expression_syntax_model table may be used to save the link of the normalized sentences with their syntactic models and the metadata of the result of the syntactic analysis of the given sentence. The external key syntax_model_id may be used for communication with the table of syntactic models.

Figure 11:
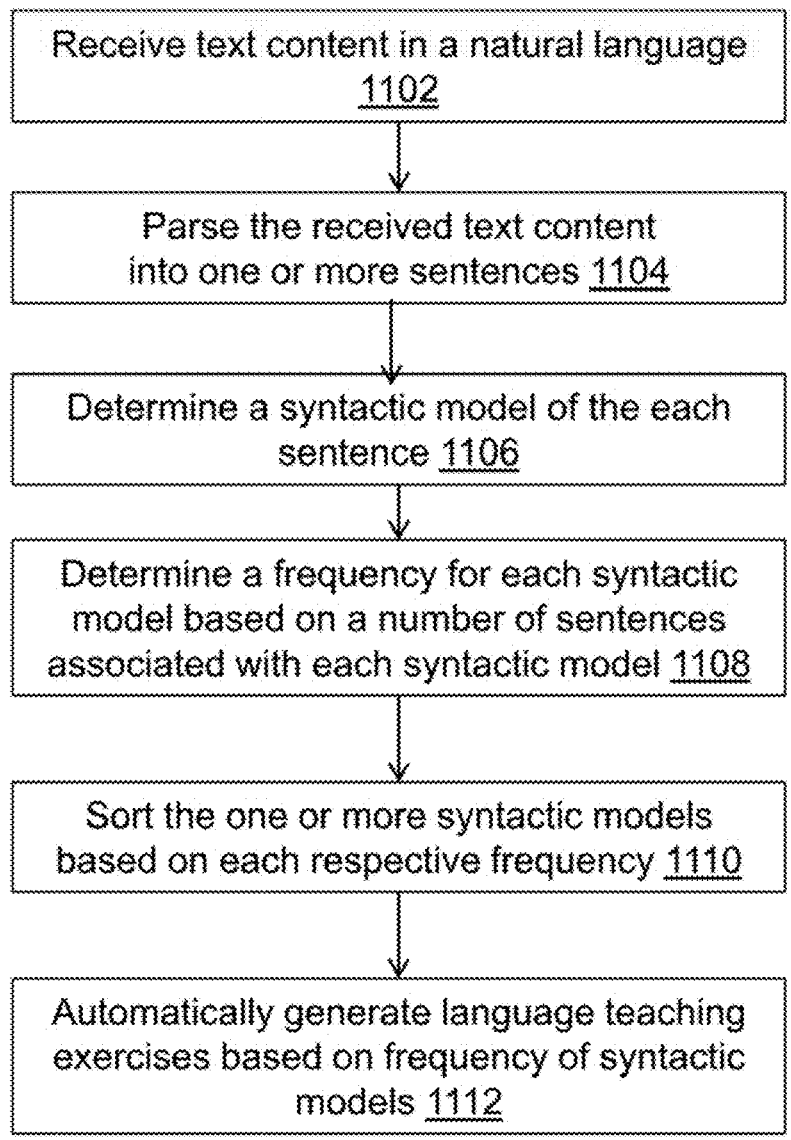
FIG. 11 is a flow diagram illustrating an example method for automated teaching of languages based on frequency of syntactic models according to one example aspect.

According to an aspect of the invention, FIG. 11 depicts an example method for automatically generating exercises for teaching a foreign language based on frequency of one or more syntactic models. The method 1100 may be implemented by the computer server system 100 of FIG. 1. At step 1102, the method 1100 may include automatically receiving, via, for example, the syntactic analysis module 110 of the processor 106 of FIG. 1, a text content via the graphical user interface 104 of the computer server system 100. At steps 1104, the method 1100 includes parsing the received text content into one or more sentences. At step 1106, the method 1100 includes determining syntactic models of the sentences. At step 1108, the method 110 includes determining a frequency for each syntactic model based on a number of sentences associated with each syntactic model. At step 1110, the method 1100 includes sorting the one or more syntactic models based on each respective frequency. At step 1112, the method 1100 includes automatically generating one or more language teaching exercises based on frequency of syntactic models.

Figure 12:
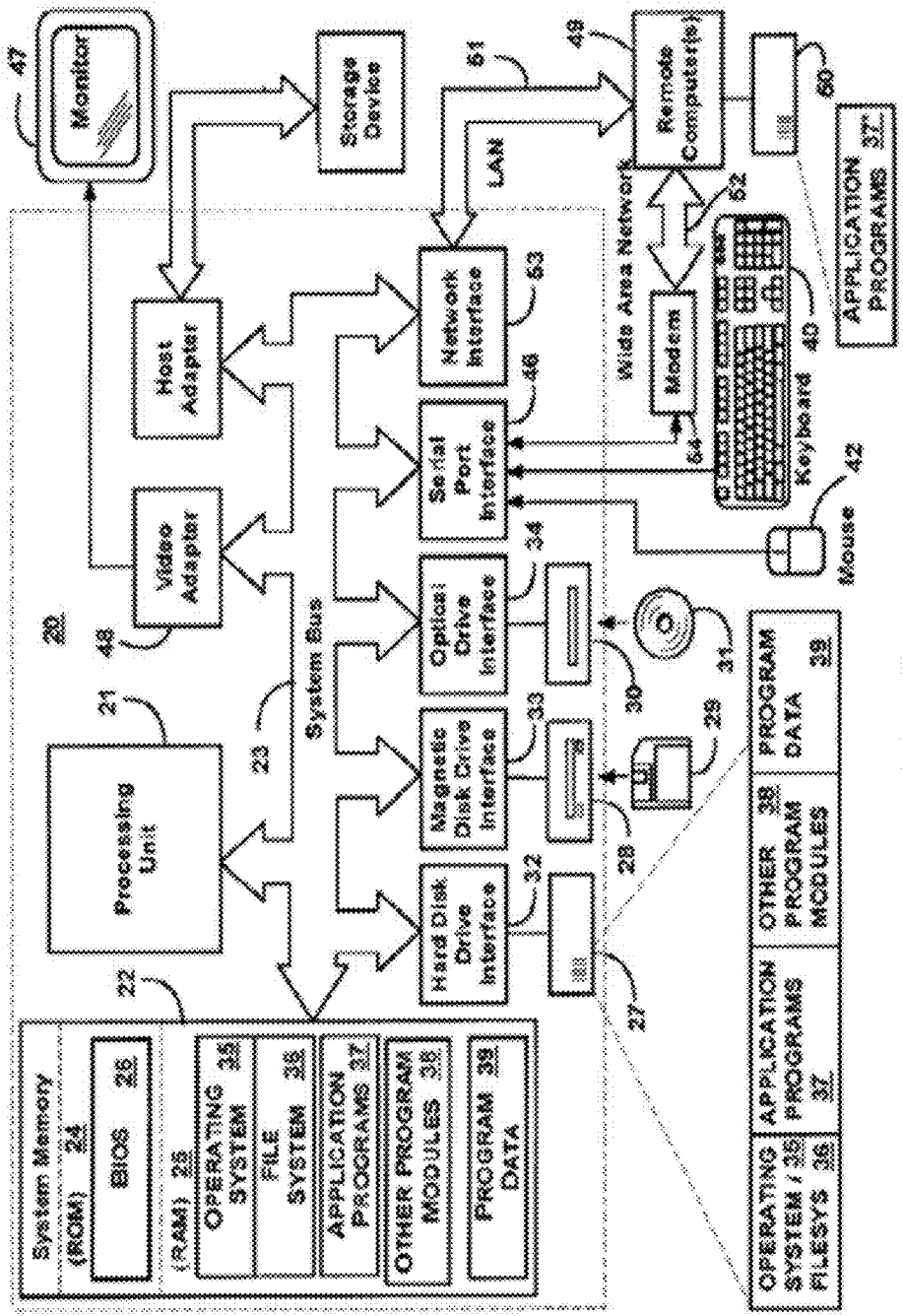
FIG. 12 is an example of a general-purpose computer system, such as a personal computer or a server, suitable for implementing discloses aspects of systems and methods for automated teaching of languages according to one example aspect.

FIG. 12 illustrates a schematic diagram of an exemplary computer or server in accordance with aspects of the invention. For example, an exemplary system for implementing the invention includes a general purpose computing device in the form of a personal computer 20 or a computer server or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks. Intranets and the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for automated teaching of languages, comprising:
   receiving, by a hardware processor, a text content in a natural language;
   parsing, by the hardware processor, the received text content into one or more sentences, wherein the parsing includes:
      partitioning the received text content into one or more tokens;
      partitioning the one or more tokens into the one or more sentences; and
      determining a lemma to correspond to each token of each sentence;
   determining, by the hardware processor, a syntactic model of each sentence and saving a link associating information of each sentence with a corresponding syntactic model;
   determining, by the hardware processor, a frequency of occurrence for each syntactic model based on a number of sentences associated with each syntactic model in the text content;
   sorting, by the hardware processor, the one or more syntactic models based on each respective frequency; and
   generating, by the hardware processor, one or more language teaching exercises, wherein an exercise includes one or more sentences selected based on the frequency of associated syntactic model.

2. The method of claim 1, wherein parsing, by the hardware processor, the text content into the one or more sentences further comprises one or more of:
   removing extensible markup language (XML) associated with each token from the received text content; and
   determining a part of speech tag to correspond to each token of each sentence.

3. The method of claim 2, wherein each token comprises metadata indicating the part of speech tag, the lemma, and the position of each token in each sentence.

4. The method of claim 2, wherein the lemma is configured to determine a set of trick words for each token.

5. The method of claim 2, further comprising;
obtaining one or more text contents; and
repeating the parsing of the one or more text contents to correlate with the one or more syntactic models and update a frequency associated with each syntactic model.

6. The method of claim 1, further comprising filtering and removing improper syntactic models related to profanity, grammatical mistakes, and substandard syntactic models.

7. The method of claim 1, further comprising:
displaying information to explain the one or more syntactic models; and
configuring the displayed information for providing teaching exercises in connection with the one or more syntactic models.

8. The method of claim 1, further comprising:
storing learning statistics of the language by a user in response to the automatically generated language teaching exercises; and
determining and storing a level of mastery of each syntactic model based on the learning statistics.

9. The method of claim 1, further comprising sorting the one or more syntactic models based on a tree clustering structure in accordance with a complexity of each syntactic model.

10. The system of claim 1, wherein the lemma is configured to determine a set of trick words for each token.

11. A computing system for automated teaching of languages, comprising:
a syntactic analysis module executable by a computer processor and configured to:
receive a text content in a natural language;
parse the received text content into one or more sentences, including:
partition the received text content into one or more tokens;
partition the one or more tokens into the one or more sentences; and
determine a lemma to correspond to each token of each sentence;
determine a syntactic model of each sentence and save a link associating information of each sentence with a corresponding syntactic model;
determine a frequency of occurrence for each syntactic model based on a number of sentences associated with each syntactic model;
sort the one or more syntactic models based on each respective frequency; and
an exercise generation module configured to generate one or more language teaching exercises, wherein an exercise includes one or more sentences selected based on the frequency of associated syntactic model.

12. The system of claim 11, wherein the syntactic analysis module is further configured to parse the received text content into the one or more sentences by:
removing extensible markup language (XML) associated with each token from the received text content; and
determining a part of speech tag to correspond to each token of each sentence.

13. The system of claim 12, wherein each token comprises metadata indicating the part of speech tag, the lemma, and the position of each token in each sentence.

14. The system of claim 12, wherein the syntactic analysis module is further configured to:
obtain one or more text contents; and
repeat the parsing of the one or more text contents to correlate with the one or more syntactic models and update a frequency associated with each syntactic model.

15. The system of claim 11, wherein the syntactic analysis module is further configured to:
filter and remove improper syntactic models from the one or more syntactic models, the improper syntactic models relating to profanity, grammatical mistakes, and substandard syntactic models; and
sort the one or more syntactic models based on a tree clustering structure in accordance with a complexity of each syntactic model.

16. The system of claim 11, further comprising a visualization module for displaying information to explain the one or more syntactic models, wherein the exercise generation module is further configured to configure the displayed information for providing learning exercises in connection with the one or more syntactic models.

17. The system of claim 11, wherein the memory is further configured to store learning statistics of the foreign language by a user in response to the automatically generated exercises for learning the foreign language, and the exercise generation module is further configured at determine a level of mastery of each syntactic model based on the learning statistics.

18. A computer program product stored in a non-transitory computer-readable storage medium, the computer program product comprising computer-executable instructions for automated teaching of languages, including instructions for:
receiving a text content in a natural language;
parsing the received text content into one or more sentences, wherein the parsing includes:
partitioning the received text content into one or more tokens;
partitioning the one or more tokens into the one or more sentences; and
determining a lemma to correspond to each token of each sentence;
determining a syntactic model of each sentence and saving a link associating information of each sentence with a corresponding syntactic model;
determining a frequency of occurrence for each syntactic model based on a number of sentences associated with each syntactic model in the text content;
sorting the one or more syntactic models based on each respective frequency; and
generating one or more language teaching exercises, wherein an exercise includes one or more sentences selected based on the frequency of associated syntactic model.

19. The computer program product of claim 18, wherein the instructions for parsing the received text content into the one or more sentences comprise instructions for:
removing extensible markup language (XML) associated with each token from the received text content; and
determining a part of speech tag to correspond to each token of each sentence.

20. The computer program product of claim 18, further comprising instructions for filtering and removing improper syntactic models from the one or more syntactic models, the improper syntactic models relating to profanity, grammatical mistakes, and substandard syntactic models.

* * * * *